US010375102B2

(12) United States Patent
Tao

(10) Patent No.: US 10,375,102 B2
(45) Date of Patent: Aug. 6, 2019

(54) MALICIOUS WEB SITE ADDRESS PROMPT METHOD AND ROUTER

(71) Applicant: Tencent Technology (Shenzhen) Company Limited, Shenzhen (CN)

(72) Inventor: Sinan Tao, Shenzhen (CN)

(73) Assignee: TENCENT TECHNOLOGY (SHENZHEN) COMPANY LIMITTED, Shenzhen (CN)

( * ) Notice: Subject to any disclaimer, the term of this patent is extended or adjusted under 35 U.S.C. 154(b) by 398 days.

(21) Appl. No.: 15/153,156

(22) Filed: May 12, 2016

(65) Prior Publication Data

US 2016/0294862 A1 Oct. 6, 2016

Related U.S. Application Data

(63) Continuation of application No. PCT/CN2014/095999, filed on Dec. 31, 2014.

(30) Foreign Application Priority Data

Jan. 3, 2014 (CN) .......................... 2014 1 0003654

(51) Int. Cl.
 *H04L 29/06* (2006.01)
 *H04L 29/08* (2006.01)

(52) U.S. Cl.
 CPC ...... *H04L 63/1433* (2013.01); *H04L 63/1416* (2013.01); *H04L 63/1441* (2013.01); *H04L 67/02* (2013.01)

(58) Field of Classification Search
 CPC ............. H04L 63/1433; H04L 63/1416; H04L 63/1441; H04L 67/02; H04L 63/101;
 (Continued)

(56) References Cited

U.S. PATENT DOCUMENTS 7,890,612 B2 * 2/2011 Todd ..................... G06F 21/577
                                                                 709/220
8,613,089 B1 * 12/2013 Holloway ........... H04L 63/1458
                                                                 726/23

(Continued)

FOREIGN PATENT DOCUMENTS

CN    102279875 A    12/2011
CN    102930211 A    2/2013
(Continued)

OTHER PUBLICATIONS

International Search Report for corresponding application PCT/CN2014/095999 filed on Dec. 31, 2014; dated Mar. 20, 2015.

*Primary Examiner* — Jason K Gee
*Assistant Examiner* — Shu Chun Gao
(74) *Attorney, Agent, or Firm* — Cantor Colburn LLP

(57) ABSTRACT

Embodiments provide a malicious website address prompt method and a router. A router acquires a target website address in a network access request in access of a user terminal, determines whether the target website address is a malicious website address, and if determining that the target website address is a malicious web site address, sends prompt information of intercepting the target website address to the user terminal. Malicious web site address intercept software does not need to be installed in the user terminal, and the security of Internet surfing of a user is improved in a case in which the malicious website address intercept software cannot be installed in the user terminal or is not installed by the user.

17 Claims, 4 Drawing Sheets

(58) Field of Classification Search
CPC ....... H04L 63/102; H04L 63/10; H04L 67/22;
H04L 63/0227; H04L 12/4633; H04L
67/28; H04L 67/26; H04L 67/1002; H04L
63/029; H04L 63/0281; H04L 63/0272;
H04L 12/4641; H04L 63/20; H04L
63/145; H04L 67/306; G06F 21/566;
G06F 17/30; G06F 11/34; G06F 21/56;
G06F 21/6218; G06F 21/567; G06F
21/572; G06F 21/606; G06F 21/85; G06F
21/51; G06F 2221/2149; G06F
17/300887; G06F 21/54; G06F 21/554;
G06F 21/552; H04W 76/10; H04W 4/50;
H04W 12/06; H04W 80/12
See application file for complete search history.

(56) References Cited

U.S. PATENT DOCUMENTS

| | | | | |
|---|---|---|---|---|
| 8,856,869 | B1* | 10/2014 | Brinskelle | H04L 63/08 726/12 |
| 8,955,092 | B2* | 2/2015 | Cooley | H04L 63/1433 726/11 |
| 8,978,140 | B2* | 3/2015 | Hubbard | H04L 63/1441 726/24 |
| 9,369,433 | B1* | 6/2016 | Paul | H04L 63/0227 |
| 9,930,053 | B2* | 3/2018 | Beauchesne | H04L 63/1416 |
| 2007/0156900 | A1* | 7/2007 | Chien | G06F 21/645 709/225 |
| 2008/0127338 | A1* | 5/2008 | Cho | G06F 21/566 726/22 |
| 2009/0290492 | A1* | 11/2009 | Wood | H04L 63/1416 370/235 |
| 2010/0205291 | A1* | 8/2010 | Baldry | G06F 15/173 709/224 |
| 2011/0214187 | A1* | 9/2011 | Wittenstein | H04L 63/1425 726/25 |
| 2011/0238855 | A1* | 9/2011 | Korsunsky | G06F 21/55 709/231 |
| 2011/0282997 | A1* | 11/2011 | Prince | G06F 16/958 709/226 |
| 2011/0302653 | A1* | 12/2011 | Frantz | G06F 21/552 726/22 |
| 2012/0036580 | A1* | 2/2012 | Gorny | H04L 63/1433 726/25 |
| 2012/0221652 | A1* | 8/2012 | Sainio | H04L 63/101 709/206 |
| 2013/0007870 | A1* | 1/2013 | Devarajan | H04L 63/1416 726/11 |
| 2013/0007882 | A1* | 1/2013 | Devarajan | H04L 63/1416 726/24 |
| 2013/0333038 | A1* | 12/2013 | Chien | H04L 63/1408 726/23 |
| 2014/0090059 | A1* | 3/2014 | Wang | H04L 63/1416 726/23 |
| 2014/0282816 | A1* | 9/2014 | Xie | H04L 63/0227 726/1 |
| 2014/0317754 | A1* | 10/2014 | Niemela | H04L 63/1416 726/26 |

FOREIGN PATENT DOCUMENTS

| | | |
|---|---|---|
| CN | 103281177 A | 9/2013 |
| CN | 103327029 A | 9/2013 |
| CN | 103491543 A | 1/2014 |
| CN | 104125209 A | 10/2014 |

* cited by examiner

MALICIOUS WEB SITE ADDRESS PROMPT METHOD AND ROUTER

CROSS REFERENCE TO RELATED APPLICATIONS

This application is a continuation of International Patent Application No. PCT/CN2014/095999 filed on Dec. 31, 2014 which claims priority to Chinese Patent Application No. 201410003654.X filed on Jan. 3, 2014, all of which said applications are herein incorporated by reference in their entirety.

TECHNICAL FIELD

The present disclosure relates to network technologies, and in particular, to a malicious website address prompt method and a router.

BACKGROUND

With the development of network technologies, malicious website addresses are emerging one after another, for example, Trojan horse websites and phishing websites. These websites impose severe threats to property, mind and body, and privacy of netizens and affect the security of Internet surfing of the netizens.

In some scenarios, the threats imposed by malicious websites to the security of Internet surfing of users are reduced by installing malicious website address intercept software in user terminals.

However, under influences of a model, a hardware configuration, or a version of an operating system of a user terminal, malicious website address intercept software cannot be installed in the user terminal, or a netizen has weak security awareness and does not install malicious website address intercept software in a user terminal. In this case, the security of Internet surfing of a user is very low.

SUMMARY

The embodiment of present invention provides a malicious website address prompt method and a router, so as to provide malicious website address prompt information to a user in a case in which malicious website address intercept software is not installed in a user terminal, thereby improving the security of Internet surfing of a user.

According to one aspect, an embodiment of the present invention provides a malicious website address prompt method, including:

acquiring, by a router, a target website address in a network access request in access of a user terminal;

determining, by the router, whether the target website address is a malicious website address; and if determining that the target website address is a malicious website address, sending, by the router, prompt information of intercepting the target website address to the user terminal.

According to another aspect, an embodiment of the present invention provides a router, including:

a website address acquiring module, that acquires a target website address in a network access request in access of a user terminal;

a processing module, that determines whether the target website address is a malicious website address; and a sending module, that sends prompt information of intercepting the target website address to the user terminal if the processing module determines that the target website address is a malicious website address.

In the malicious website address prompt method and the router provided in the embodiment, a router acquires a target website address in a network access request in access of a user terminal, determines whether the target website address is a malicious website address, and if it is determined that the target website address is a malicious website address, sends prompt information of intercepting the target website address to the user terminal. Malicious website address intercept software does not need to be installed in the user terminal, and the security of Internet surfing of a user is improved in a case in which the malicious website address intercept software cannot be installed in the user terminal or is not installed by the user.

DESCRIPTION OF EMBODIMENTS

In the embodiment of present invention, a router detects a malicious website address and prompts a user terminal according to a detection result. Malicious website address intercept software does not need to be installed in the user terminal, and the security of Internet surfing of a user is improved in a case in which the malicious website address intercept software cannot be installed in the user terminal or is not installed by the user.

The following describes in detail the technical solutions of the present invention by using specific embodiments.

Figure 1:
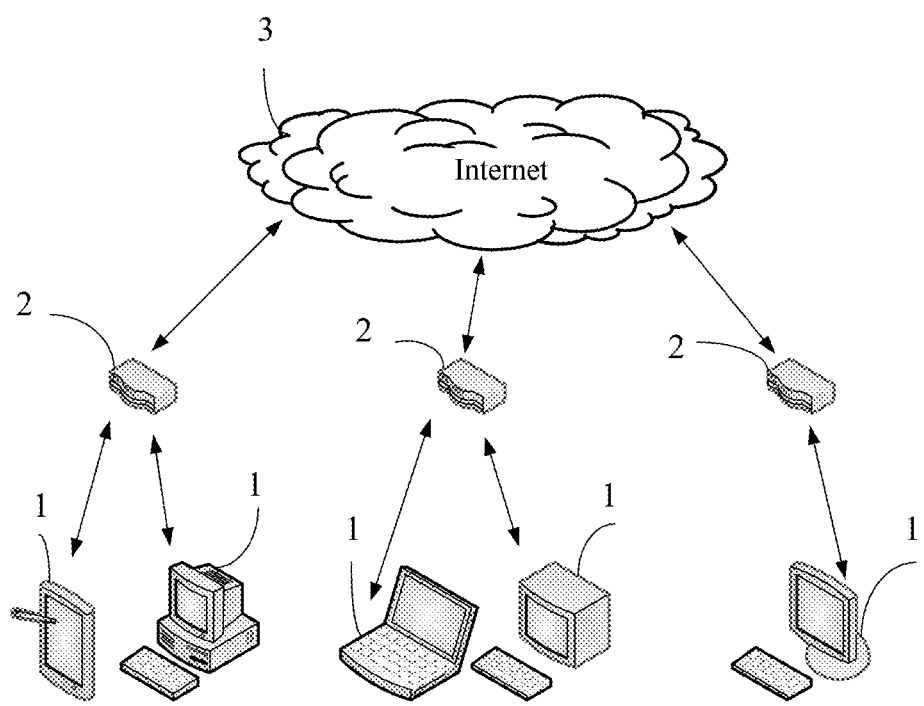
FIG. 1 is a schematic diagram of an application scenario of malicious website address prompt of an embodiment of the present invention.

FIG. 1 is a schematic diagram of an application scenario of malicious website address prompt of an embodiment of present invention. As shown in FIG. 1, an application scenario of each embodiment of the present invention includes at least one user terminal 1, where the user terminal is, for example, a personal computer (PC), a mobile phone, or a tablet computer, at least one router 2, and the Internet 3, where each user terminal 1 is connected to the Internet 3 by using the router 2. Information sent to the Internet 3 and information received from the Internet 3 by the user terminal 1 both pass through the router 2. Therefore, in the embodiment of present invention, the router can detect a malicious website address and prompt the user terminal according to a detection result.

Figure 2:
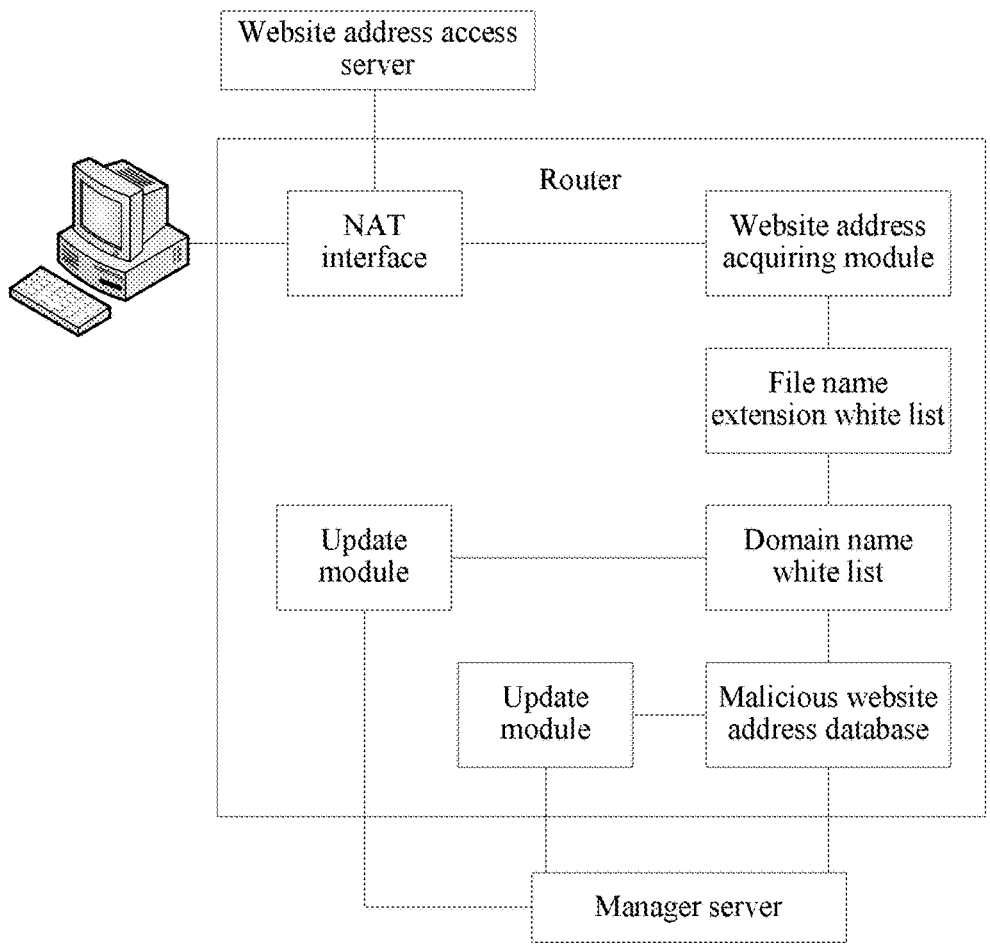
FIG. 2 is a schematic structural diagram of a malicious website address prompt system of an embodiment of the present invention.

FIG. 2 is a schematic structural diagram of a malicious website address prompt system of the embodiment of present invention. As shown in FIG. 2, a router includes a network address translation (NAT) interface, that translates a private network protocol (Internet Protocol (IP)) address of each user terminal in a local area network into one legal external network IP address, so that a plurality of user terminals in the local area network shares the one legal external network IP address to access the Internet. A website address sent by a website address access server in the Internet is intercepted when the website address passes through the NAT interface of the router. A website address acquiring module in the router acquires a target website address in a network access request, then performs filtration by using a domain name white list and/or a file name extension white list stored in the router, to determine whether the target website address is a potential malicious website address, and if the target website address is a potential malicious website address, further determines whether the target website address is a malicious website address according to a malicious website address database stored in a local cache of the router, and if the target website address is not a website address in the malicious website address database, further determines whether the target website address is a malicious website address in another manner, for example, sending the acquired target website address to a manager server for query. In the foregoing embodiment, the domain name white list and the malicious website address database that are stored in the router may be updated periodically according to a website address sent by the manager server.

In the following embodiments, a network access request includes, but is not limited to, a Hypertext Transfer Protocol (HTTP) request, and a website address includes, but is not limited to, a first Uniform Resource Locator (URL).

Figure 3:
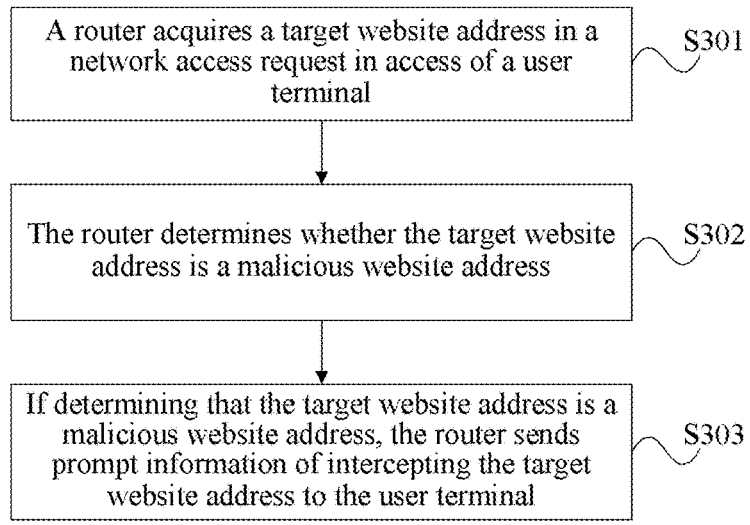
FIG. 3 is a schematic flowchart of Embodiment 1 of a malicious website address prompt method of the present invention.

FIG. 3 is a schematic flowchart of Embodiment 1 of a malicious website address prompt method of the present invention. Referring to FIG. 1 to FIG. 3, the method of this embodiment includes:

S301: A router acquires a target website address in a network access request in access of a user terminal.

Specifically, the router translates, by using an NAT technology, a private network protocol (Internet Protocol (IP)) address of each user terminal in a local area network into one legal external network IP address, so that a plurality of user terminals in the local area network shares the one legal external network IP address to access the Internet. A user terminal in the local area network may be, for example, a PC, a mobile phone, or a tablet computer. A router of a set Wireless Local Area Network (WLAN) is set as a default gateway. When receiving a first data packet in access of a user terminal in the local area network, the router modifies the first data packet by modifying a source IP address in the original first data packet to a first IP address (one IP address of a plurality of IP addresses of the router) and modifying a source port number to a first port number (one port of a plurality of ports of the router) of the router, sends the modified first data packet to the external network, and records correspondences between the source IP address and the first IP address of the router and between the source port number and the first port number of the router. When receiving a second data packet sent by the external network with a destination IP address being the first IP address and a destination port number being the first port number, the router replaces the destination IP address and the destination port number of the second data packet with the corresponding source IP address and source port number according to the recorded correspondences between the source IP address and the first IP address of the router and between the source port number and the first port number of the router, and sends the second data packet to the user terminal.

It can be known from the working principle of the router that the router can acquire all data packets exchanged between internal and external networks. By using this feature, when requesting to access a certain website of the external network, first, the user terminal sends a network access request for accessing the website to the external network, and the router can acquire host and query strings from a network access request packet, so as to acquire a target website address in the network access request in access of the user terminal.

S302: The router determines whether the target website address is a malicious website address.

Specifically, the router may determine whether the target website address is a malicious website address according to some specific rules.

First, whether the target website address is a potential malicious website address is determined. A potential malicious website address means that the probability of the target website address being a malicious website address is greater than a preset value. If the target website address is a potential malicious website address, whether the target website address is a malicious website address is further determined.

S303: If determining that the target website address is a malicious website address, the router sends prompt information of intercepting the target website address to the user terminal.

By sending the prompt information of intercepting the target website address to the user terminal, a user is notified that a risk exists in a website to be accessed, and the user determines, according to the prompt, whether to continue the access.

In this embodiment, a router acquires a target website address in a network access request in access of a user terminal, determines whether the target website address is a malicious website address, and if determining that the target website address is a malicious website address, sends prompt information of intercepting the target website address to the user terminal. Malicious website address intercept software does not need to be installed in the user terminal, and the security of Internet surfing of a user is improved in a case in which the malicious website address intercept software cannot be installed in the user terminal or is not installed by the user.

Figure 4:
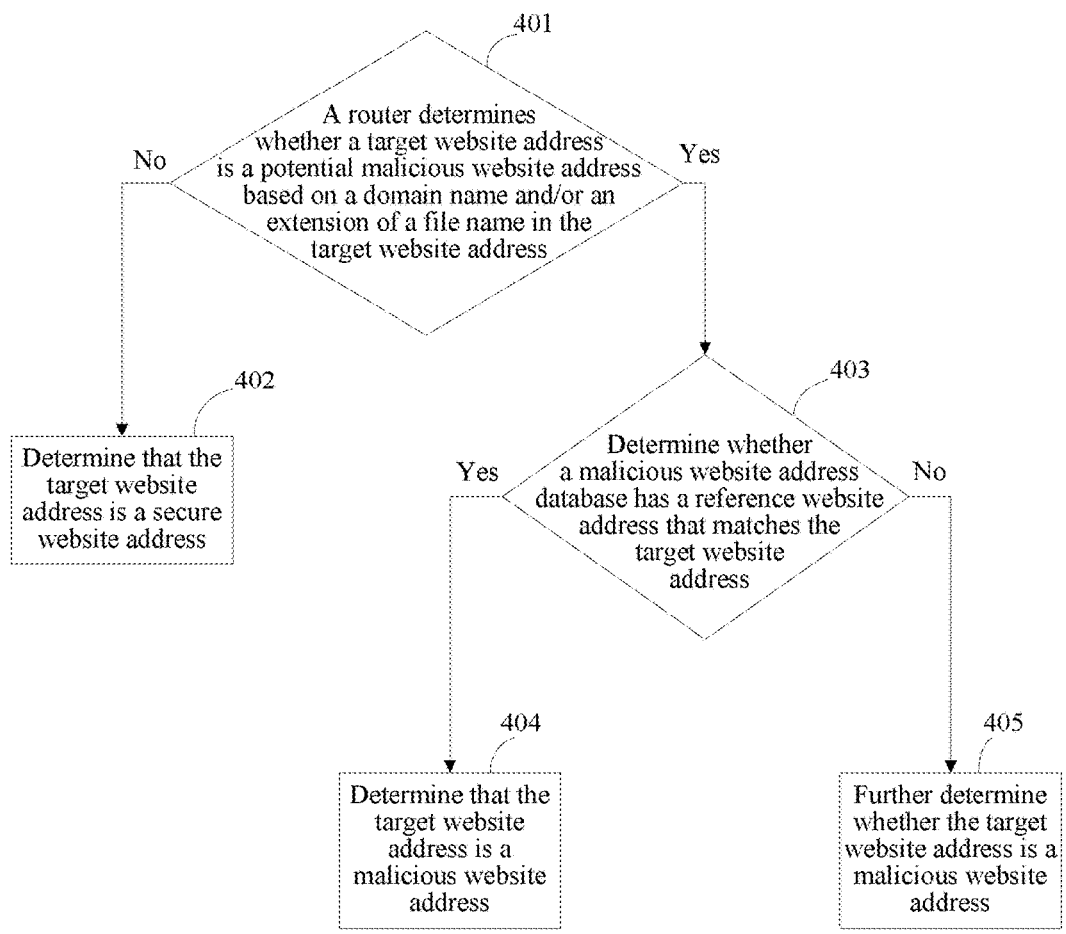
FIG. 4 is a schematic flowchart of Embodiment 2 of a malicious website address prompt method of the present invention.

In step S302 of the embodiment shown in FIG. 3, the router determines whether the target website address is a malicious website address, of which one implementation manner is as shown in FIG. 4. FIG. 4 is a schematic flowchart of Embodiment 2 of a malicious website address prompt method of the present invention.

S401: The router determines whether the target website address is a potential malicious website address based on a domain name and/or an extension of a file name in the target website address.

The router stores a domain name white list and/or a file name extension white list locally.

If the target website address includes a domain name in the domain name white list, it can be determined that the target website address is a secure website address. A domain name in the domain name white list is, for example, "qq.com", "baidu.com", or "sina.com". If the target website address includes a file of which an extension is one in the file name extension white list, for example, "*.css", "*.jpg", "*.js", or "*.png", it can be determined that the target website address is a secure website address.

Whether the target website address is a potential malicious website address may be determined only based on the domain name in the target website address, be determined only based on the extension of the file name in the target website address, or be determined by combining the domain name and the extension of the file name in the target website address.

In a first implementation manner, determining whether the target website address is a potential malicious website address only based on the domain name in the target website address specifically is: matching the domain name in the target website address against a domain name in the domain name white list, if the domain name in the target website address is a domain name in the domain name white list, determining that the target website address is a secure website address, and if the domain name in the target website address is not a domain name in the domain name white list, determining that the target website address is a potential malicious website address.

In a second implementation manner, determining whether the target website address is a potential malicious website address only based on the extension of the file name in the target website address specifically is: matching the extension of the file name in the target website address against an extension in the file name extension white list, if the extension of the file name in the target website address is an extension in the file name extension white list, determining that the target website address is a secure website address, and if the extension of the file name in the target website address is not an extension in the file name extension white list, determining that the target website address is a potential malicious website address.

In a third implementation manner, determining whether the target website address is a potential malicious website address by combining the domain name and the extension of the file name in the target website address specifically is:

when the target website address includes the domain name and the extension of the file name: if the domain name in the target website address is a domain name in the domain name white list, or the extension of the file name in the target website address is an extension in the file name extension white list, determining that the target website address is a secure website address; and matching the domain name in the target website address against a domain name in the domain name white list, if the domain name included in the target website address is not a domain name in the domain name white list, further determining whether the extension of the file name included in the target website address is an extension in the file name extension white list, and if the extension of the file name included in the target website address is not an extension in the file name extension white list, determining that the target website address is a potential malicious website address.

when the target website address does not include the extension of the file name, determining whether the target website address is a potential malicious website address only based on the domain name in the target website address, which is not described again herein.

It should be noted that the domain name white list and/or the file name extension white list stored in the router may be updated periodically. Specifically, the domain name white list of the router is synchronized by dynamic increment delivery by a server. The router may periodically send a version number of the local domain name white list and/or file name extension white list to the server in a heartbeat manner to inquire whether there is an incremental update. The server replies to the router whether there is an incremental update for the version sent by the router and notifies the router of the number of incremental updates. The router acquires an incremental update from the server, updates the incremental update to a cache that locally stores the domain name white list and/or the file name extension white list, and updates the version number of the domain name white list and/or the file name white list.

Whether the target website address is a potential malicious website address is determined by using any one of the three implementation manners. If the target website address is not a potential malicious website address, perform S402, and if the target website address is a potential malicious website address, perform S403.

S402: Determine that the target website address is a secure website address.

S403: Determine whether a malicious website address database has a reference website address that matches the target website address, if yes, perform S404, and if not, perform S405.

The target website address is matched against a reference website address in the malicious website address database. Each reference website addresses stored in the malicious website address database is a malicious website address. If the malicious website address database has a reference website address that matches the target website address, perform S404, and if the malicious website address database does not have a reference website address that matches the target website address, perform S405.

S404: Determine that the target website address is a malicious website address.

Because each reference website address stored in the malicious website address database is a malicious website address, therefore, if the malicious website address database has a reference website address that matches the target website address, it can be determined that the target website address is a malicious website address.

Furthermore, the malicious website address database may further include a security level corresponding to each reference website address. The security level is, for example, low, intermediate, or severe. When a security level corresponding to a reference website address is low, it indicates that the threats to the security of Internet surfing of a user are small. When a security level corresponding to a reference website address is intermediate, it indicates that the threats to the security of Internet surfing of a user are intermediate. When a security level corresponding to a reference website address is severe, it indicates that the threats to the security of Internet surfing of a user are severe. After determining that the target website address is a malicious website address, the router determines that a security level corresponding to the reference website address that matches the target website address is a security level of the target website address and adds the security level of the target website address to the prompt information of intercepting the target website address sent to the user terminal, so that a user adopts different processing policies according to different security levels.

S405: Further determine whether the target website address is a malicious website address.

If the malicious website address database does not have a reference website address that matches the target website address, it is necessary to further determine whether the target website address is a malicious website address. The specific determining method may be as shown in FIG. 5.

By using the method of the embodiment shown in FIG. 4, a secure website address is filtered according to a domain name white list and/or a file name extension white list, to determine a potential malicious website address, and then the potential malicious website address is matched against a reference website address in a malicious website address database to further determine whether the target website address is a malicious website address, thereby reducing the number of website addresses that need matching, and improving the matching efficiency.

Figure 5:
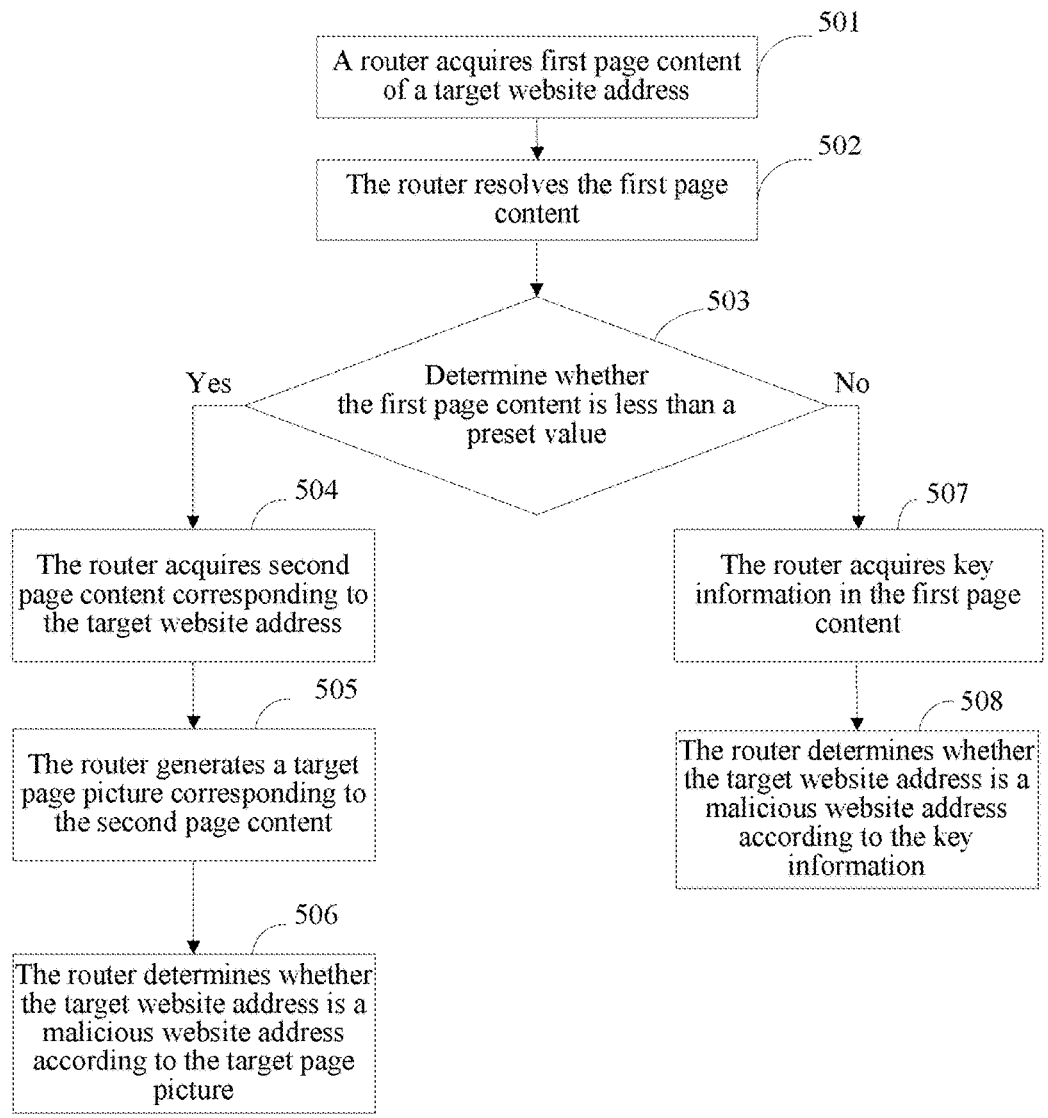
FIG. 5 is a schematic flowchart of Embodiment 3 of a malicious website address prompt method of the present invention.

FIG. 5 is a schematic flowchart of Embodiment 3 of a malicious website address prompt method of the present invention. FIG. 5 illustrates one of methods for further determining whether the target website address is a malicious website address when it is determined in the embodiment shown in FIG. 4 that the malicious website address database does not have a reference website address that matches the target website address. As shown in FIG. 5, the method of this embodiment includes:

S501: The router acquires first page content of the target website address.

The router distributes different target website addresses to different detection engines for authentication. A crawler module in a detection engine captures first page content of the target website address. The crawler module acquires, starting from a website address of one or more initial webpages, a sub website address from the initial webpage, and continuously extracts, in the webpage crawling process, new sub website addresses from a current page and puts the new sub website addresses in a queue until a stop condition of the system is met. The system stores all webpages (that is, the first page content) captured by the crawler and performs certain analysis, filtration, and index establishment thereon for subsequent query and retrieval.

S502: The router resolves the first page content.

S503: Determine whether the first page content is less than a preset value. If the first page content is less than a preset value, perform S504. Otherwise, perform S507.

The first page content being less than the preset value generally means that the first page content is small in amount, has many interference words, and does not have much semantic information. In this case, comprehensive determining is performed by using a method of determining a malicious website address using a browser webpage snapshot and picture recognition, a page finally displayed on the browser to a user is snapshot and captured, and whether the target website address is a malicious website address is determined by using relevant recognition tools such as text recognition and human face recognition on the captured picture. That is, steps of S504 to S506 are performed to determine whether the target website address is a malicious website address.

If the first page content is rich, perform steps of S507 to S508 to determine whether the target website address is a malicious website address.

S504: The router acquires second page content corresponding to the target website address.

The router may acquire, by using a browser (webkit) kernel, the second page content corresponding to the target website address from a server designated by the target website address.

S505: The router generates a target page picture corresponding to the second page content.

The router may generate a target page picture corresponding to the second page content by means of page rendering.

S506: The router determines whether the target website address is a malicious website address according to the target page picture.

The specific implementation of the step includes, but is not limited to, the following three implementation manners.

A first implementation manner is: performing, by the router, similarity matching on the target page picture and a reference page picture in a preset malicious picture database; and if the similarity is greater than a preset value, determining, by the router, that the target website address is a malicious website address.

A second implementation manner is: recognizing, by the router, the target page picture to acquire content in the target page picture, and matching the content in the target page picture against content of a reference page picture in a preset malicious picture database; and if the preset malicious picture database has content of a reference page picture that matches the content in the target page picture, determining, by the router, that the target website address is a malicious website address.

A third implementation manner is: comprehensively determining whether the target website address is a malicious website address by combining the first implementation manner and the second implementation manner, and specifically: performing similarity matching on the target page picture and a page picture in a preset malicious picture database to acquire a first matching result, recognizing the target page picture to acquire content in the target page picture, for example, a text and an object, matching the content in the target page picture against content of a reference page picture in the preset malicious picture database to acquire a second matching result, and determining whether the target website address is a malicious website address by combining the first matching result and the second matching result.

S507: The router acquires key information in the first page content.

The key information is used for discriminating a malicious attribute of a page, where the key information is, for example, an executable JS, a title of the page, or copy right information, for constructing a document object model (DOM) and browser object model (BOM) trees formed by the page, and also resolving an external link quoted in the webpage for use by a quoting thermodynamic and statistic module.

S508: The router determines whether the target website address is a malicious website address according to the key information.

The specific implementation of the step includes, but is not limited to, the following three implementation manners.

A first implementation manner is: performing, by the router, word segmentation on text content in the key information to obtain semantic information of the text content; performing, according to the semantic information of the text content, similarity matching on the text content in the key information and text content of a malicious page stored in a preset malicious page database; and if the similarity is greater than a preset value, determining, by the router, that the target website address is a malicious website address.

A second implementation manner is: performing, by the router, word segmentation on text content in the key information to obtain semantic information of the text content; determining a class of the first page content according to the semantic information of the text content by means of a Bayesian classifier, a keyword model, and/or decision tree learning, where the class may be, for example, economy, sport, pornography, phishing, and Trojan horse, where pornography, phishing, and Trojan horse, belong to a class of malicious website addresses; and if the class of the first page content belongs to the class of malicious website addresses, determining, by the router, that the target website address is a malicious website address.

A third implementation manner is: comprehensively determining whether the target website address is a malicious website address by integrating the determining results of the first implementation manner and the second implementation manner, and specifically: performing, according to semantic information of the text content, similarity matching on text content in the key information and text content of a malicious page stored in a preset malicious page database, to acquire a matching result, determining a class of the first page content according to the semantic information of the text content by means of a Bayesian classifier, a keyword model, and/or decision tree learning, to acquire a classifying result, and determining whether the target website address is a malicious website address according to the matching result and the classifying result.

The method of the embodiment shown in FIG. 5 is directed to processing in a case in which whether the target website address is a malicious website address still cannot be determined after matching the target website address against a reference website address in the malicious website address database. By using this implementation manner, after it is determined that the target website address is a malicious website address, prompt information of intercepting the target website address is sent to the user terminal. Malicious website address intercept software does not need to be installed in the user terminal, and the security of Internet surfing of a user is improved in a case in which the malicious website address intercept software cannot be installed in the user terminal or is not installed by the user.

In the foregoing embodiments, after the determining that the target website address is a malicious website address, the method further includes: adding the target website address to the malicious website address database, so as to enlarge coverage of malicious website addresses stored in the malicious website address database, thereby further improving the security of Internet surfing of the user.

Figure 6:
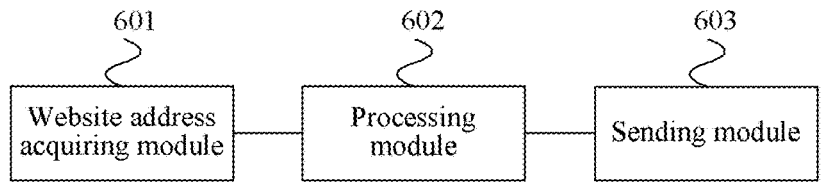
FIG. 6 is a schematic structural diagram of Embodiment 1 of a router of the present invention.

FIG. 6 is a schematic structural diagram of Embodiment 1 of a router of the present invention. As show in FIG. 6, the router of this embodiment includes a website address acquiring module 601, a processing module 602, and a sending module 603, where the website address acquiring module 601 is configured to acquire a target website address in a network access request in access of a user terminal, the processing module 602 is configured to determine whether the target website address is a malicious website address, and the sending module 603 is configured to send prompt information of intercepting the target website address to the user terminal if the processing module determines that the target website address is a malicious website address.

The apparatus in the foregoing embodiment correspondingly can execute the technical solution of the method embodiment shown in FIG. 3, of which implementation principles and technical effects are similar, and details are not described again herein.

In the foregoing embodiment, the processing module 602 includes: a pre-processing submodule and a website address cloud query submodule. The pre-processing submodule is configured to determine whether the target website address is a potential malicious website address based on a domain name and/or an extension of a file name in the target website address, where if the pre-processing submodule determines that the target website address is a potential malicious website address, the website address cloud query submodule is configured to match the target website address against a reference website address in a preset malicious website address database, where the reference website address is a malicious website address, and if the malicious website address database has a reference website address that matches the target website address, the website address cloud query submodule determines that the target website address is a malicious website address.

The apparatus in the foregoing embodiment correspondingly can be configured to execute the technical solution of the method embodiment shown in FIG. 4, of which implementation principles and technical effects are similar, and details are not described again herein.

In the foregoing embodiment, the processing module 602 includes an acquiring submodule, configured to acquire first page content of the target website address if the malicious website address database does not have a reference website address that matches the target website address; a page resolving submodule, configured to resolve the first page content to acquire key information in the first page content; and a determining submodule, configured to determine whether the target website address is a malicious website address according to the key information.

In the foregoing embodiment, the determining submodule includes: a text content word segmentation unit, configured to perform word segmentation on text content in the key information to acquire semantic information of the text content; a text similarity matching unit, configured to perform similarity matching on the text content in the key information and text content of a malicious page stored in a preset malicious page database according to the semantic information of the text content; and a determining unit, configured to determine that the target website address is a malicious website address if the similarity is greater than a preset value.

In the foregoing embodiment, the determining submodule includes: a text content word segmentation unit, configured to perform word segmentation on text content in the key information to acquire semantic information of the text content; a text-based machine recognizing unit, configured to determine a class of the first page content according to the semantic information of the text content by means of a Bayesian classifier, a keyword model, and/or decision tree learning; and a determining unit, configured to determine that the target website address is a malicious website address if the class of the first page content belongs to a class of malicious website addresses.

In the foregoing embodiment, the processing module includes: an acquiring submodule, configured to acquire first page content of the target website address if the malicious website address database does not have a reference website address that matches the target website address; a page resolving submodule, configured to resolve the first page content; a page screenshot submodule, configured to, if the first page content is less than a preset value, acquire second page content corresponding to the target website address, and generate a target page picture corresponding to the second page content; and a determining submodule, configured to determine whether the target website address is a malicious website address according to the target page picture.

In the foregoing embodiment, the determining submodule includes: a picture similarity matching unit, configured to perform similarity matching on the target page picture and a reference page picture in a preset malicious picture database; and a determining unit, configured to determine that the target website address is a malicious website address if the similarity is greater than a preset value.

In the foregoing embodiment, the determining submodule includes: a picture recognizing unit, configured to recognize the target page picture to acquire content in the target page picture, and match the content in the target page picture against content of a reference page picture in a preset malicious picture database; and a determining unit, configured to determine that the target website address is a malicious website address if the preset malicious picture database has content of a reference page picture that matches the content in the target page picture.

The apparatus in the foregoing embodiment correspondingly can be configured to execute the technical solution of the method embodiment shown in FIG. 5, of which implementation principles and technical effects are similar, and details not described again herein.

Persons of ordinary skill should understand that all or some of the steps of the method according to the embodiments may be implemented by a program instructing relevant hardware. The program may be stored in a computer readable storage medium, and executed by one or processors. When the program is run, the steps of the method according to the embodiments are performed. The storage medium is any medium that is capable of storing program code, for example, a ROM, a RAM, a magnetic disk, or an optical disc. The one or more processors may be a central processing unit (CPU) or a micro programmed control unit (MCU).

Finally, it should be noted that the embodiments are merely provided for describing the technical solutions of the embodiment of present invention, but not intended to limit the embodiment of present invention. The sequence numbers of the above embodiments of the disclosure are only for the purpose of description, and do not represent one embodiment is superior to another. Although the embodiment of present invention is described in detail with reference to the foregoing embodiments, persons of ordinary skill in the art should understand that they may still make modifications to the technical solutions described in the foregoing embodiments or make equivalent replacements to some technical features thereof, without departing from the principle and scope of the technical solutions of the embodiments of the present invention.

The invention claimed is:

1. A malicious website address prompt method performed at a router having one or more processors and one or more memories for storing programs to be executed by the processors, the method comprising:
    acquiring, by the router, a target website address in a network access request from a user terminal;
    determining, by the router, whether the target website address is a malicious website address based on a domain name in the target website address and/or an extension of a file name comprised in the target website address; and
    if the router determines that the target website address is a malicious website address, sending, by the router, prompt information of intercepting the target website address to the user terminal;
    wherein the determining, by the router, whether the target website address is a malicious website address based on a domain name in the target website address and/or an extension of a file name comprised in the target website address comprises:
    determining, by the router, whether the target website address is a potential malicious website address based on a domain name in the target website address and/or an extension of a file name comprised in the target website address;
    if the router determines that the target website address is a potential malicious website address, matching the target website address against a reference website address in a preset malicious website address database, wherein the reference website address is a malicious website address;
    if the malicious website address database has a reference website address that matches the target website address, determining, by the router, that the target website address is a malicious website address; and
    if the malicious website address database does not have a reference website address that matches the target website address, acquiring, by the router, first page content of the target website address; resolving, by the router, the first page content; if the first page content is less than a preset value, acquiring, by the router, second page content corresponding to the target website address; generating, by the router, a target page picture corresponding to the second page content and determining, by the router, whether the target website address is a malicious website address according to the target page picture.

2. The method according to claim 1, wherein the malicious website address database further comprises a security level corresponding to the reference website address;
    after the router determines that the target website address is a malicious website address, the method further comprises: determining, by the router, that the security level corresponding to the reference website address that matches the target website address is a security level of the target website address; and
    the sending prompt information of intercepting the target website address to the user terminal comprises: sending the prompt information of intercepting the target website address to the user terminal, wherein the prompt information comprises the security level of the target website address.

3. The method according to claim 1, further comprising:
    if the malicious website address database does not have a reference website address that matches the target website address, acquiring, by the router, first page content of the target website address;
    resolving, by the router, the first page content to acquire key information in the first page content; and
    determining, by the router, whether the target website address is a malicious website address according to the key information.

4. The method according to claim 3, wherein the determining, by the router, whether the target website address is a malicious website address according to the key information comprises:
    performing, by the router, word segmentation on text content in the key information to obtain semantic information of the text content;
    performing, by the router according to the semantic information of the text content, similarity matching on the text content and text content of a malicious page stored in a preset malicious page database; and
    if the similarity is greater than a preset value, determining, by the router, that the target website address is a malicious website address.

5. The method according to claim 3, wherein the determining, by the router, whether the target website address is a malicious website address according to the key information comprises:
    performing, by the router, word segmentation on text content in the key information to obtain semantic information of the text content;
    determining, by the router, a class of the first page content according to the semantic information of the text content by means of a Bayesian classifier, a keyword model, and/or decision tree learning; and if the class of the first page content belongs to a class of malicious website addresses, determining, by the router, that the target website address is a malicious website address.

6. The method according to claim 1, wherein the determining, by the router, whether the target website address is a malicious website address according to the target page picture comprises:

performing, by the router, similarity matching on the target page picture and a reference page picture in a preset malicious picture database; and if the similarity is greater than a preset value, determining, by the router, that the target website address is a malicious website address.

7. The method according to claim 1, wherein the determining, by the router, whether the target website address is a malicious website address according to the target page picture comprises:

recognizing, by the router, the target page picture to acquire content in the target page picture, and matching the content in the target page picture against content of a reference page picture in a preset malicious picture database; and if the preset malicious picture database has content of a reference page picture that matches the content in the target page picture, determining, by the router, that the target website address is a malicious website address.

8. The method according to claim 1, wherein the determining, by the router, whether the target website address is a potential malicious website address based on a domain name in the target website address comprises:

matching, by the router, the domain name in the target website address against a domain name in a domain name white list; and if the domain name in the target website address is not a domain name in the domain name white list, determining, by the router, that the target website address is a potential malicious website address.

9. The method according to claim 1, wherein the determining, by the router, whether the target website address is a potential malicious website address based on an extension of a file name in the target website address comprises:

matching, by the router, the extension of the file name in the target website address against an extension in a file name extension white list; and if the extension of the file name in the target website address is not an extension in the file name extension white list, determining, by the router, that the target website address is a potential malicious website address.

10. The method according to claim 1, wherein after the determining that the target website address is a malicious website address, the method further comprises:

adding the target website address to the malicious website address database.

11. The method according to claim 1, wherein the network access request is a Hypertext Transfer Protocol (HTTP) request and the website address is a uniform resource locator (URL).

12. A router, comprising:
one or more processors;
one or more memories; and
one or more programs stored in the memories and to be executed by the processors, the programs further including instructions for:

a website address acquiring module, configured to acquire a target website address in a network access request from a user terminal;

a processing module, configured to determine whether the target website address is a malicious website address based on a domain name in the target website address and/or an extension of a file name comprised in the target website address; and a sending module, configured to send prompt information of intercepting the target website address to the user terminal if the processing module determines that the target website address is a malicious website address, wherein the processing module comprises:

a pre-processing submodule, configured to determine whether the target website address is a potential malicious website address based on a domain name and/or an extension of a file name in the target website address, a website address cloud query submodule, configured to match the target website address against a reference website address in a preset malicious website address database, if the pre-processing submodule determines that the target website address is a potential malicious website address, wherein the reference website address is a malicious website address; and determine that the target website address is a malicious website address if the malicious website address database has a reference website address that matches the target website address;

wherein the processing module further comprises:

an acquiring submodule, configured to acquire first page content of the target website address if the malicious website address database does not have a reference website address that matches the target website address;

a page resolving submodule, configured to resolve the first page content;

a page screenshot submodule, configured to, if the first page content is less than a preset value, acquire second page content corresponding to the target website address, and generate a target page picture corresponding to the second page content; and a determining submodule, configured to determine whether the target website address is a malicious website address according to the target page picture.

13. The router according to claim 12, wherein the processing module comprises:

an acquiring submodule, configured to acquire first page content of the target website address if the malicious website address database does not have a reference website address that matches the target website address;

a page resolving submodule, configured to resolve the first page content to acquire key information in the first page content; and a determining submodule, configured to determine whether the target website address is a malicious website address according to the key information.

14. The router according to claim 13, wherein the determining submodule comprises:

a text content word segmentation unit, configured to perform word segmentation on text content in the key information to obtain semantic information of the text content;

a text similarity matching unit, configured to perform similarity matching according to the semantic information of the text content on the text content and text content of a malicious page stored in a preset malicious page database; and a determining unit, configured to determine that the target website address is a malicious website address if the similarity is greater than a preset value.

15. The router according to claim 13, wherein the determining submodule comprises:
   a text content word segmentation unit, configured to perform word segmentation on text content in the key information to obtain semantic information of the text content;
   a text-based machine recognizing unit, configured to determine a class of the first page content according to the semantic information of the text content by means of a Bayesian classifier, a keyword model, and/or decision tree learning; and
   a determining unit, configured to determine that the target website address is a malicious website address if the class of the first page content belongs to a class of malicious website addresses.

16. The router according to claim 12, wherein the determining submodule comprises:
   a picture similarity matching unit, configured to perform similarity matching on the target page picture and a reference page picture in a preset malicious picture database; and
   a determining unit, configured to determine that the target website address is a malicious website address if the similarity is greater than a preset value.

17. The router according to claim 12, wherein the determining submodule comprises:
   a picture recognizing unit, configured to recognize the target page picture to acquire content in the target page picture, and match the content in the target page picture against content of a reference page picture in a preset malicious picture database; and
   a determining unit, configured to determine that the target website address is a malicious website address if the preset malicious picture database has content of a reference page picture that matches the content in the target page picture.

* * * * *